V. L. HAYNES.
ATTACHMENT FOR HARVESTERS.
APPLICATION FILED NOV. 14, 1912.

1,092,046.

Patented Mar. 31, 1914.
2 SHEETS—SHEET 1.

WITNESSES

INVENTOR
Venice L. Haynes
By his Attorney

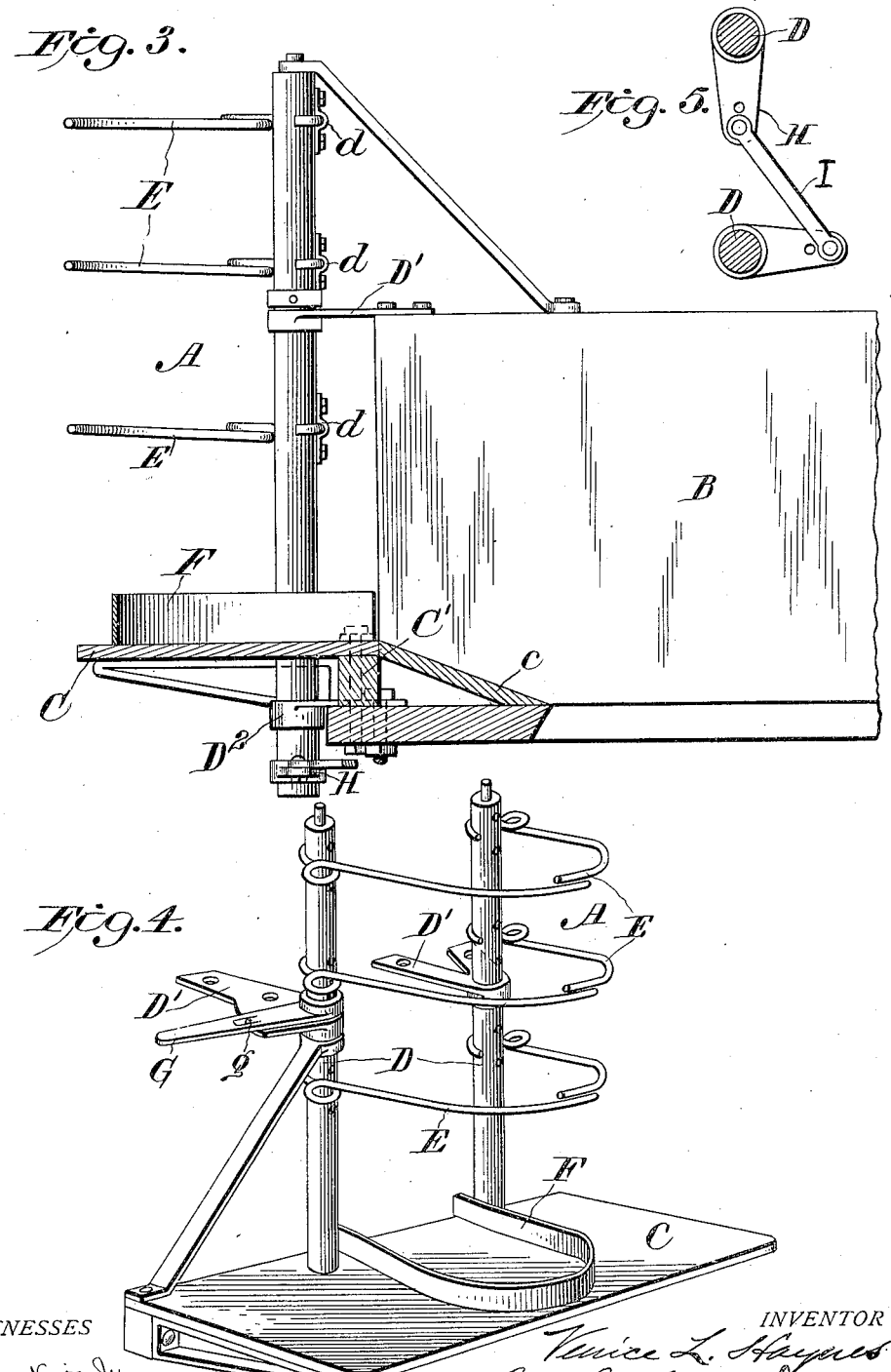

UNITED STATES PATENT OFFICE.

VENICE L. HAYNES, OF WILMINGTON, OHIO, ASSIGNOR OF ONE-HALF TO CHARLES W. SWAIN, OF WILMINGTON, OHIO.

ATTACHMENT FOR HARVESTERS.

1,092,046.  Specification of Letters Patent.  Patented Mar. 31, 1914.

Application filed November 14, 1912.  Serial No. 731,387.

*To all whom it may concern:*

Be it known that I, VENICE L. HAYNES, a citizen of the United States, residing at Wilmington, in the county of Clinton and State of Ohio, have invented certain new and useful Improvements in Attachments for Harvesters; and I do hereby declare the following to be a full, clear, and exact description of the invention, such as will enable others skilled in the art to which it appertains to make and use the same.

This invention relates to machines for harvesting corn, and more particularly to an attachment to a corn harvester for use in gathering corn into bundles or bunches to be removed by hand and placed in a shock.

The main object of the invention is to provide a simple and efficient device adapted for attachment to an ordinary corn harvester for gathering the corn as it is cut and retaining the stalks in an upright position until a bundle or bunch of the desired size has been collected, and which may then be easily removed by hand and placed in a shock.

Further objects of the invention are to dispense with means for binding, and thereby save the twine ordinarily used in binding the corn into sheaves, and also to prevent the corn from being wasted by being knocked off the stalks by the needle of the binder, and by forming shocks of bundles unbound to prevent the corn from rotting in the sheaves as is incident to the practice of binding the bundles forming a shock.

The invention will first be hereinafter more particularly described, with reference to the accompanying drawings, which form a part of this specification, and then pointed out in the claims at the end of the description.

Figure 1:
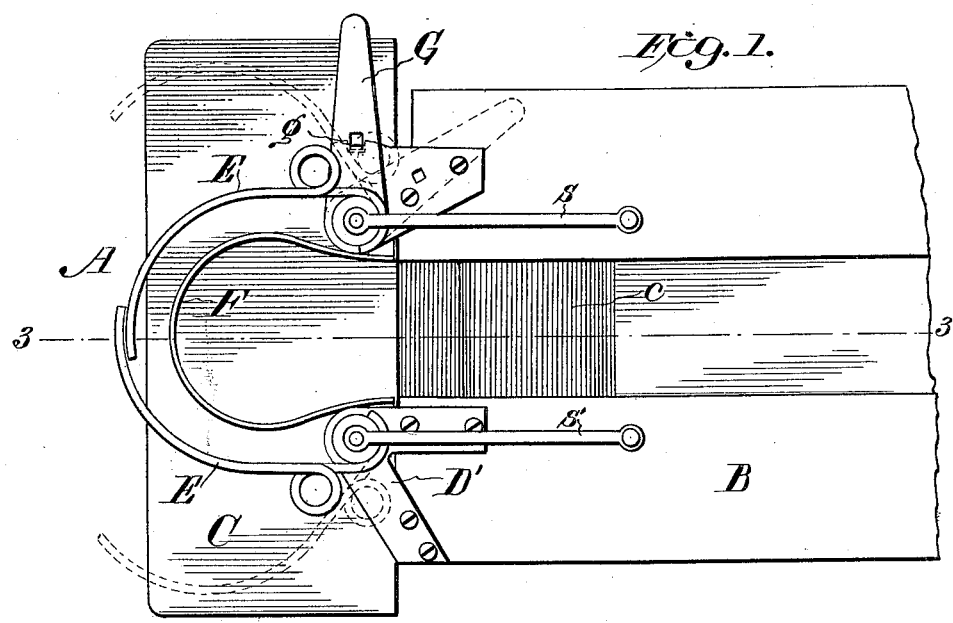
Figure 2:
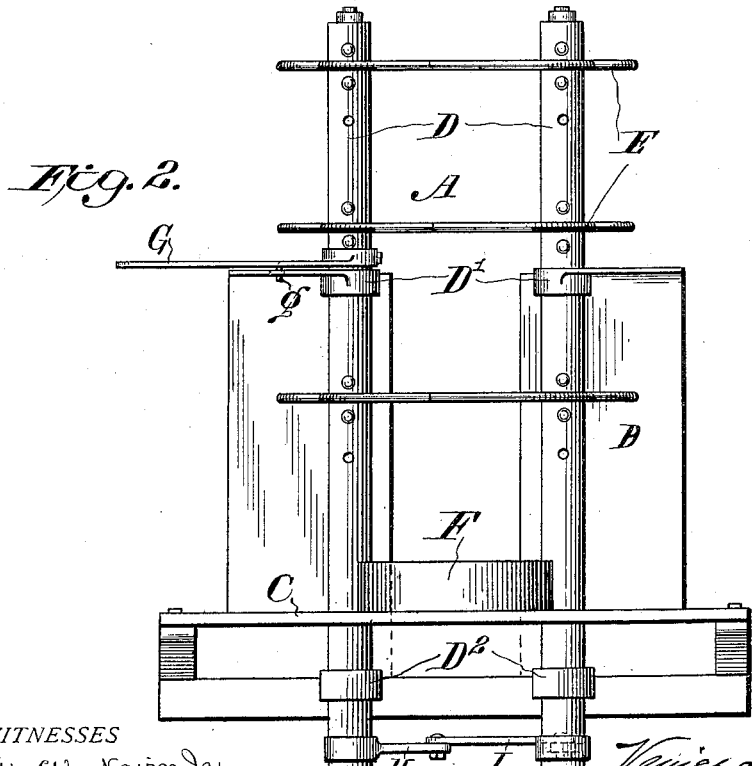

In said drawings, Figure 1 is a top or plan view of my improved buncher attached to an ordinary corn harvester, a fragmentary portion of which is shown, the bunch forming arms being closed, and the position thereof when open being indicated in dotted lines; Fig. 2 is a rear view of the same; Fig. 3 is a vertical longitudinal sectional elevation taken on the line 3—3 of Fig. 1; Fig. 4 is a perspective view of the bunching device detached from the harvester, and Fig. 5 is a detail sectional view of the connections between the upright shafts for operating both sets of bunch gathering arms simultaneously to open the buncher for removing the gathered grain.

Referring to the drawings, in which the same letters of reference are used to denote corresponding parts in different views, the letter A may denote the shock forming device or buncher which is shown attached to a fragmentary portion B of an ordinary corn harvester having a channel or guideway along which the corn as it is cut may be conveyed and delivered in an upright position on a platform C located at the rear end of the machine. The cut grain may be moved along the channel formed by the sides and bottom of the harvester frame and up the incline *c* onto the platform C by any suitable means, for example, an endless carrier such as heretofore used for a similar purpose in grain harvesting and shocking machines.

The harvesting machine and carrier form no part of my invention, and may be of any desired construction, having a suitable channel along which the cut grain may be carried and discharged in an upright position into the arms of the shock forming device or buncher from which it may be readily removed by hand as hereinafter described.

The shock forming device or buncher consists essentially of upright shafts D, carrying arms E which extend rearwardly and are curved to form a substantially semi-circular closure when the two sets of arms are in closed position to receive the corn as it is delivered from the cutters, and a platform below said arms onto which the corn is carried and bunched, together with means for holding said arms in a closed position and for opening the same when it is desired to remove the bunch of corn therefrom. The arms E may be secured to the uprights D in any suitable manner, but are preferably secured thereto by suitable clips *d* and bolts passing through holes in the uprights D, as shown, to adapt them to be adjusted vertically for varying the distance between the arms or the distance from the uppermost arm to the platform, in order that the attachment may be used in gathering corn of any size or height. To this end the shafts D may each have a series of spaced openings or holes therein to receive the fastening bolts *d* by which the arms E are secured thereon. A guard-plate F, of approximately horse-shoe shaped construction secured on the platform C has its forward ends arranged and secured in alinement with opposite sides of the channel in the harvester frame along which the corn is carried and delivered to the buncher, so as to hold the butts of the stalks in proper position and prevent them from being pushed off of the platform.

In order that the attachment may be secured to any ordinary harvester frame and removed therefrom at will, the uprights D may be journaled in suitable bearings formed integral with or secured to brackets D¹ D² adapted for attachment to the rear of a harvester frame by suitable fastening bolts, as shown, or in any other suitable manner. In the form shown the shafts are fitted in sleeves on the brackets which are bolted to opposite sides of the harvester frame, one set above and the other below the plane of the platform C, which may be bolted or otherwise secured to a transverse bar C¹ which in turn may be bolted to the rear end of the harvester. For the purpose of opening and closing the bunch gathering arms or fingers and holding them in closed position a lever G may be secured on one shaft D and provided with a detent or lug $g$ adapted to engage a recess or opening formed in a lateral extension of the bracket D¹ in which the shaft is journaled, so that when the lug engages the recess said lever is locked in normal position with the bunch gathering arms or fingers closed, but when the lever is unlocked and thrown forwardly the free ends of the two sets of arms will be spread apart and thrown into the dotted line position indicated in Fig. 1 of the drawings. The lever G may be provided with a spring-actuated dog to engage the recess in the bracket D¹ but it is preferably made of spring metal or resilient so that when it is desired to open the arms of the buncher for removing the grain the handle of the lever may be raised sufficiently to lift the lug $g$ out of the recess in the bracket whereupon by turning the handle of the lever the shaft D will turn, carrying with it the arms thereon. By providing a series of notches or openings for engaging the lug on the lever G it may be locked in different positions so as to enlarge or decrease the closure formed by the arms E. In order that both sets of arms may work in unison, suitable connections are provided between the shafts D, D, to adapt one shaft to turn to the right as the other is turned to the left, or vice versa, and to this end a bracket H fixed on one shaft is connected by a link I with a similar bracket fixed on the other shaft, the arms of the brackets projecting substantially at right angles to each other so that when one shaft is turned in either direction the other shaft will turn with it but in an opposite direction, throwing the arms or fingers E into open or closed or an intermediate position, according to the extent and direction in which the shafts are turned.

The size of the closure formed by the arms E may be increased or diminished so as to form bundles of different sizes by substituting longer or shorter arms and correspondingly lengthening or shortening the distance between the brackets connected by the link I, by either substituting links of different lengths or forming a series of apertures in the link or brackets to provide the desired adjustment, as indicated in Fig. 5.

The operation of the invention will be readily understood from the foregoing description when taken in connection with the accompanying drawings.

Assuming that the harvester to which the device is attached is provided with the usual cutters and means for moving the cut corn along the usual channel provided for that purpose, the operator, standing upon the platform C, by manipulating the lever G, may throw the arms E into a closed position and when a suitable bunch of corn has been gathered the lever may be thrown into position to open said arms whereupon the bunch of corn may be removed and placed in a shock, and shocks may be formed of any desired size, without tying the grain in bundles, and without the loss of grain due to the ears being knocked off of the stalks by the needle of the binder as usual in operating corn harvesters and binders as heretofore constructed. If however it is desired to use the attachment with a binder, this device is capable of receiving grain bound up as well as that which is loose, though it is especially designed for gathering grain to form shocks without binding the same into bundles, in order to avoid the liability of rotting which is incident to the use of twine binding the stalks of corn into bundles. It should also be borne in mind that while the attachment is primarily designed for use in harvesting corn it may be used to gather other grain, when desired to gather the whole stalks with the grain into bunches or bundles to be placed in suitable shocks. The device is simple and inexpensive to manufacture, and may be attached to any ordinary corn harvester and easily detached therefrom, and by means of the described adjustments it may be adapted to receive corn of any height and to form bundles of any desired size.

It will be understood, of course, that any suitable means may be employed for attaching the bunching device to a harvester, the particular means employed for this purpose being immaterial.

It will also be understood that various changes may be made in the details of construction and arrangement of parts without departing from the spirit and scope of my invention.

Having thus described my invention, what I claim as new and desire to secure by Letters Patent of the United States is:

1. An attachment for a corn harvester having a channel along which the cut corn is carried for delivery at the rear of the machine, consisting of a device for gathering the corn into bunches, said device comprising a platform in rear of said channel having a guard plate thereon of approximately semi-circular form with its ends in alinement with the sides of said channel, a pair of upright shafts journaled in suitable bearings at opposite sides of said guard plate, each shaft carrying a set of fingers which extend rearwardly therefrom over said platform, the fingers of one set being curved toward those of the other set so that they meet at their free ends, a bracket on each of said shafts extending at an angle to each other, a link connecting said brackets, a lever secured to one of said shafts so as to revolve therewith, a lug on said lever, and means for engaging said lug and holding said lever stationary with the fingers in a closed position.

2. An attachment for a corn harvester having a channel along which the cut corn is carried for delivery at the rear of the machine consisting of a device for gathering the corn into bunches, comprising a platform in rear of said channel, bearing plates above and below said platform at opposite sides of said channel, an upright shaft journaled in said bearing plates at each side of said channel, each shaft carrying a set of curved fingers which extend rearwardly therefrom over said platform, operative connections between the shafts whereby they are caused to turn in opposite directions, a lever secured to one of said shafts, and means for holding said lever stationary.

3. An attachment for a corn harvester having a channel along which the cut corn is carried for delivery at the rear of the machine, consisting of a device for gathering the corn into bunches, said device comprising a platform in rear of said channel having a guard plate thereon of approximately semicircular form with its ends in alinement with the sides of said channel, an upright shaft journaled in suitable bearings at each side of said guard plate, each shaft carrying a set of curved fingers which extend rearwardly therefrom over said platform, a bracket on each of said shafts extending at relatively different angles, a link connecting said brackets, an operating lever secured to one of said shafts, and means for holding said lever stationary.

4. In combination, a platform adapted for attachment to a corn harvester having a channel along which the cut corn is carried to said platform, a guard-plate on said platform having its ends arranged in alinement with the sides of said channel, upright shafts extending through said platform and revolubly fitted in bearings provided with means for attachment to the harvester frame, each of said shafts carrying a set of fingers which extend rearwardly therefrom over said platform and together form a substantially semi-circular closure to receive and retain the corn in an upright position, said fingers being adjustable vertically to adapt the machine to harvest corn of different heights, connections between said shafts whereby they are adapted to be turned simultaneously in opposite directions, said connections being adjustable to vary the size of the closure formed by said fingers, and means for opening and closing said fingers and for locking them in closed position.

5. An attachment for grain harvesters having means thereon for rigidly securing it to any ordinary harvester and detached at will comprising a platform, upright shafts revolubly mounted on said platform in bearings provided with means for attachment to the harvester frame, each of said shafts carrying a set of fingers which extend rearwardly therefrom over said platform and together form a substantially semi-circular closure to receive and retain the stalks in an upright position, means for connecting said shafts so that they may be turned simultaneously in opposite directions, and means for turning the shafts to open or close said fingers and for locking them in closed position.

In testimony whereof I affix my signature in the presence of two witnesses.

VENICE L. HAYNES.

Witnesses:
  D. K. PALMER,
  W. H. WALKER.

---

Copies of this patent may be obtained for five cents each, by addressing the "Commissioner of Patents, Washington, D. C."

It is hereby certified that the name of the assignee in Letters Patent No. 1,092,046, granted March 31, 1914, upon the application of Venice L. Haynes, of Wilmington, Ohio, for an improvement in "Attachments for Harvesters," was erroneously written and printed "Charles W. Swain," whereas said name should have been written and printed *Charles W. Swaim;* and that the said Letters Patent should be read with this correction therein that the same may conform to the record of the case in the Patent Office.

Signed and sealed this 21st day of April, A. D., 1914.

[SEAL.]

J. T. NEWTON,

*Acting Commissioner of Patents.*